Oct. 9, 1928.
C. JOHNSON
SCRAPER
Filed Feb. 2, 1927
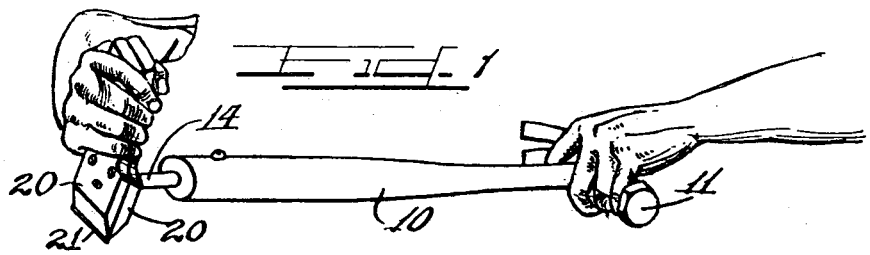
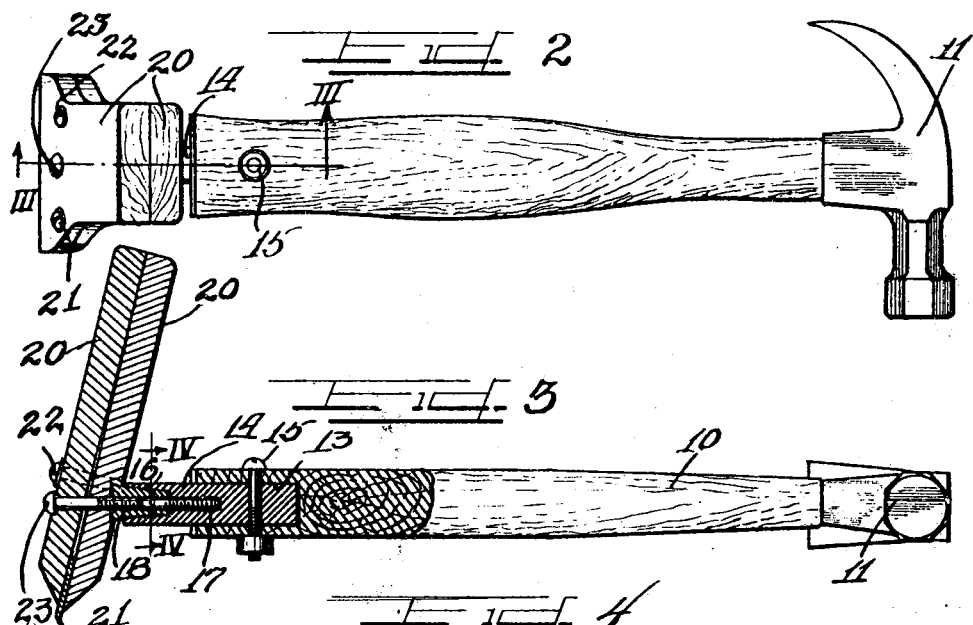
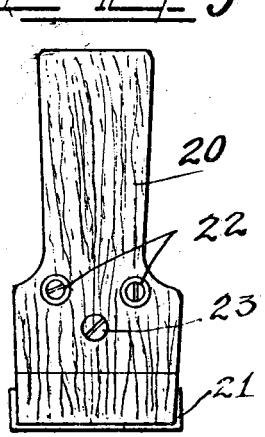

Patented Oct. 9, 1928.

1,686,816

UNITED STATES PATENT OFFICE.

CHRISTIAN JOHNSON, OF CHICAGO, ILLINOIS.

SCRAPER.

Application filed February 2, 1927. Serial No. 165,304.

This invention relates to floor scrapers with particular reference to a novel handle arrangement therefor.

In the usual use of floor scrapers, the steel scraper proper is held in wooden jaws serving as a hand hold and a handle projecting from one side of the jaws is gripped by the operator's other hand, which pulls while the hand on the jaws gives the pressure to hold the scraper down as well as assisting in traversing the same. Such a scraper is an awkward article to pack into a carpenter's portable tool kit, and if the handle is made detachable for convenience, it serves no other purpose when the scraper is not in use and takes up valuable space in the tool kit. It is accordingly an object of this invention to provide a scraper adapted to be detachably secured to the handle of a hammer or other like tool, so that the hammer head will provide a convenient hand grip for pulling the scraper, and when the scraper is not in use, the usefulness of the hammer is not affected by the attachment.

Other and further important objects of this invention will be apparent from the disclosures in the specification and the accompanying drawings.

This invention (in a preferred form) is illustrated in the drawings and hereinafter more fully described.

On the drawings:

Figure 1 is a perspective sketch showing a scraper embodying the features of this invention in use.

Figure 2 is a top plan view of the assembled scraper.

Figure 3 is a side view partly in section on the line III—III of Figure 2.

Figure 4 is a cross section on the line IV—IV of Figure 3.

Figure 5 is a face view of the scraper.

As shown on the drawings:

A carpenter's claw hammer has been chosen for illustrative purposes in the drawings, comprising a handle 10 and a head 11. The handle end is recessed at 13 to receive an attaching member 14 which is bolted in place, as indicated at 15, and forms a permanent part of the handle. The projecting part of the member 14 is provided with a conical socket 16 with a threaded hole at the bottom to receive a threaded stud 17 which is pinned to a frustro-conical member 18 fitting the socket 16 so that the member 18 is held in contact with the walls of the socket.

The scraper as a unit comprises a pair of similar jaws 20 gripping the scraper proper 21 between their lower ends and drawn together by screws 22, the assembled scraper being held on the conical member 18 by a screw 23, the member 18 being recessed into the rear scraper jaw to set the scraper at the proper angle relative to the handle. The operation of the scraper is greatly facilitated by the handle provided by the hammer head 11 which fits the operator's hand and gives a better grip than would the plain hammer handle 10, the scraper 20 being held down on the work by the operator's other hand, the two grips resembling that of a plane except that a draw stroke is used. When it is desired to separate the scraper and hammer, the conical member and stud 17 are unscrewed from the socket 16 which remains a part of the hammer handle while the scraper alone can be disposed in the usual cramped tool kit as it occupies a minimum of space.

It will thus be seen that I have produced a simple and compact combination wherein the hammer head is put to a new and novel use as a handle for the scraper.

I am aware that many changes may be made, and numerous details of construction may be varied through a wide range without departing from the principles of this invention, and I therefore do not purpose limiting the patent granted hereon otherwise than necessitated by the prior art.

I claim as my invention:

A device of the class described, comprising a scraper of opposed clamping members and a scraping blade therebetween, a threaded pin extending through the clamping members, a handle having a recess formed in one end thereof, a socket member secured in the recess and having a tapered socket in the outer end thereof, a complementary tapered member removably secured in the socket, extending therefrom, and threadedly engaging the said pin, and recess means formed in one of the clamping members engaged by the said complementary member at its larger end to retain the scraper at a fixed angle relative to the handle, and whereby downward force applied to the scraper is borne by the complementary member to relieve the said threaded pin of undue strain.

In testimony whereof I have hereunto subscribed my name at Chicago, Cook County, Illinois.

CHRISTIAN JOHNSON.